United States Patent [19]

Poulin et al.

[11] Patent Number: 5,135,438

[45] Date of Patent: Aug. 4, 1992

[54] TRANSMISSION JOINT OF THE SLIDING TYPE

[75] Inventors: Bernard Poulin, Conflans Ste Honorine; Michel Margerie, Vetheuil, both of France

[73] Assignee: Glaenzer Spicer, Poissy, France

[21] Appl. No.: 670,173

[22] Filed: Mar. 14, 1991

[30] Foreign Application Priority Data

Apr. 18, 1990 [FR] France .................. 90 04935

[51] Int. Cl.$^5$ ............................ F16D 3/26
[52] U.S. Cl. ........................ 464/111; 464/905
[58] Field of Search .......... 464/111, 120, 123, 112, 464/124, 905, 106

[56] References Cited

U.S. PATENT DOCUMENTS

| 2,777,306 | 1/1957 | Wildbaber | 464/111 |
| 4,026,123 | 5/1977 | Durum | 464/111 |
| 4,036,032 | 7/1977 | Durum | 464/111 |

FOREIGN PATENT DOCUMENTS

| 2848125 | 5/1980 | Fed. Rep. of Germany . | |
| 1218082 | 12/1959 | France . | |
| 0266830 | 11/1986 | Japan | 464/111 |
| 61-266830 | 11/1986 | Japan . | |
| 63-115927 | 7/1988 | Japan . | |

Primary Examiner—Daniel P. Stodola
Assistant Examiner—Tony A. Gayoso
Attorney, Agent, or Firm—Harness, Dickey & Pierce

[57] ABSTRACT

A transmission joint of the sliding type in which a first element (12) is connected to a first shaft (14) and comprises trunnion journals (20) distributed angularly in a regular manner about the geometrical axis (A1) of the first shaft (14), each trunnion journal (20) receives a rolling element (22) which is mounted so as to rotate and slide on the trunnion journal, the geometrical axis (AT) of the trunnion journal forms a first acute angle with respect to a reference line perpendicular to the axis (A1) of the first shaft (14) and contained within a plane containing the geometrical axes (A1, AT) of the first shaft (14) and of the trunnion journal (20), and in which a second element (16) is connected to a second shaft (18) and comprises rolling paths distributed angularly in a regular manner about the geometrical axis (A2) of the second shaft, each rolling path comprises two parallel tracks (34) between which is accommodated a rolling element (22), the center longitudinal axis (ACR) of the rolling path contained within a plane containing the geometrical axis (A2) of the second shaft (18) forms a second acute angle with the geometrical axis (A2) of the second shaft, characterized in that the value of each of the said acute angles is less than 15°.

2 Claims, 3 Drawing Sheets

FIG_1

TRANSMISSION JOINT OF THE SLIDING TYPE

The present invention relates to a transmission joint of the sliding type.

The invention relates, more particularly, to a sliding transmission joint of the type in which a first element is connected to a first shaft and comprises trunnion journals distributed angularly in a regular manner about the geometrical axis of the first shaft, each trunnion journal receiving a rolling element which is mounted so as to rotate and slide on the trunnion journal, and in which a second element is connected to a second shaft and comprises rolling paths distributed angularly in a regular manner about the geometrical axis of the second shaft, each rolling path comprising two parallel tracks between which is accommodated one of the rolling elements.

In the most conventional design of this type of joint, the geometrical axes of the trunnion journals are perpendicular to the axis of the first shaft, and the center longitudinal axes of the rolling paths are parallel to the geometrical axis of the second shaft.

This type of joint can produce, when operating under a torque and at an angle, cyclic axial forces which are transmitted to the whole of the transmission equipped with such joints and which, in particular, generate considerable noise.

In order to overcome this problem, numerous solutions have been proposed, one of which consists, for example, in modifying the configuration of the center longitudinal axes of the rolling paths in order to give them a so-called "semi-toric" curvature.

Such a configuration of the rolling paths is satisfactory when the joint operates close to its ideal operating position, but its qualities deteriorate as soon as this ideal operating configuration is departed from, it then being possible for the axial reaction forces generated to be, in particular, greater than those of a conventional sliding joint with straight tracks parallel to the axis of rotation. It has, moreover, been noted that when the ideal operating position of the joint is departed from, the sliding force of the joint increases rapidly and reaches values which can become unacceptable.

This known design of a sliding joint makes it no longer possible to meet the requirements of modern motor vehicles since the usable sliding area of the joint proves to be insufficient.

The document U.S. Pat. No. 4,026,123 describes and illustrates a sliding transmission joint of the type mentioned above in which the geometrical axis of the trunnion journal forms a first acute angle with respect to a reference line perpendicular to the axis of the first shaft and contained within a plane containing the geometrical axes of the first shaft and of the trunnion journal, and in which the center longitudinal axis of the rolling path contained within a plane containing the geometrical axis of the second shaft forms a second acute angle with the geometrical axis of the second shaft.

In the transmission joint which is the subject of this document, the values of the acute angles of inclination of the trunnion journals and of the rolling paths are very great, of the order of approximately 45°.

In this design, the sliding forces of the joint are very great, significantly greater than those of a conventional joint, and preclude the use of such a joint on a modern motor vehicle. The axial forces produced by such a joint are unacceptable as they are very considerably greater than those of a conventional joint. The usable sliding area of this joint is limited and its overall mechanical efficiency is very poor.

The object of the present invention is to provide a transmission joint of the sliding type which, irrespective of the relative axial position of the two elements of the joint, has substantially constant properties and, in particular, minimum axial reaction forces and constancy of the relative sliding force of the two elements of the joint.

To this end, the invention provides a transmission joint of the sliding type in which a first element is connected to a first shaft and comprises trunnion journals distributed angularly in a regular manner about the geometrical axis of the first shaft, each trunnion journal receives a rolling element which is mounted so as to rotate and slide on the trunnion journal, the geometrical axis of the trunnion journal forms a first acute angle with respect to a reference line perpendicular to the axis of the first shaft and contained within a plane containing the geometrical axes of the first shaft and of the trunnion journal, and in which a second element is connected to a second shaft and comprises rolling paths distributed angularly in a regular manner about the geometrical axis of the second shaft, each rolling path comprises two parallel tracks between which is accommodated a rolling element, the center longitudinal axis of the rolling path contained within a plane containing the geometrical axis of the second shaft forms a second acute angle with the geometrical axis of the second shaft, characterized in that the value of each of the said acute angles is less than 15°.

According to another feature of the invention, when the joint is in its aligned position in which the geometrical axes of the first shaft and of the second shaft coincide, the axis of the trunnion journal forms a third angle with respect to the center longitudinal axis of the associated rolling path, the value of which is other than 90°.

Other features and advantages of the invention will emerge from reading the description which follows, given as a non-limiting example, for the understanding of which reference will be made to the attached drawings, in which.

Figure 1:
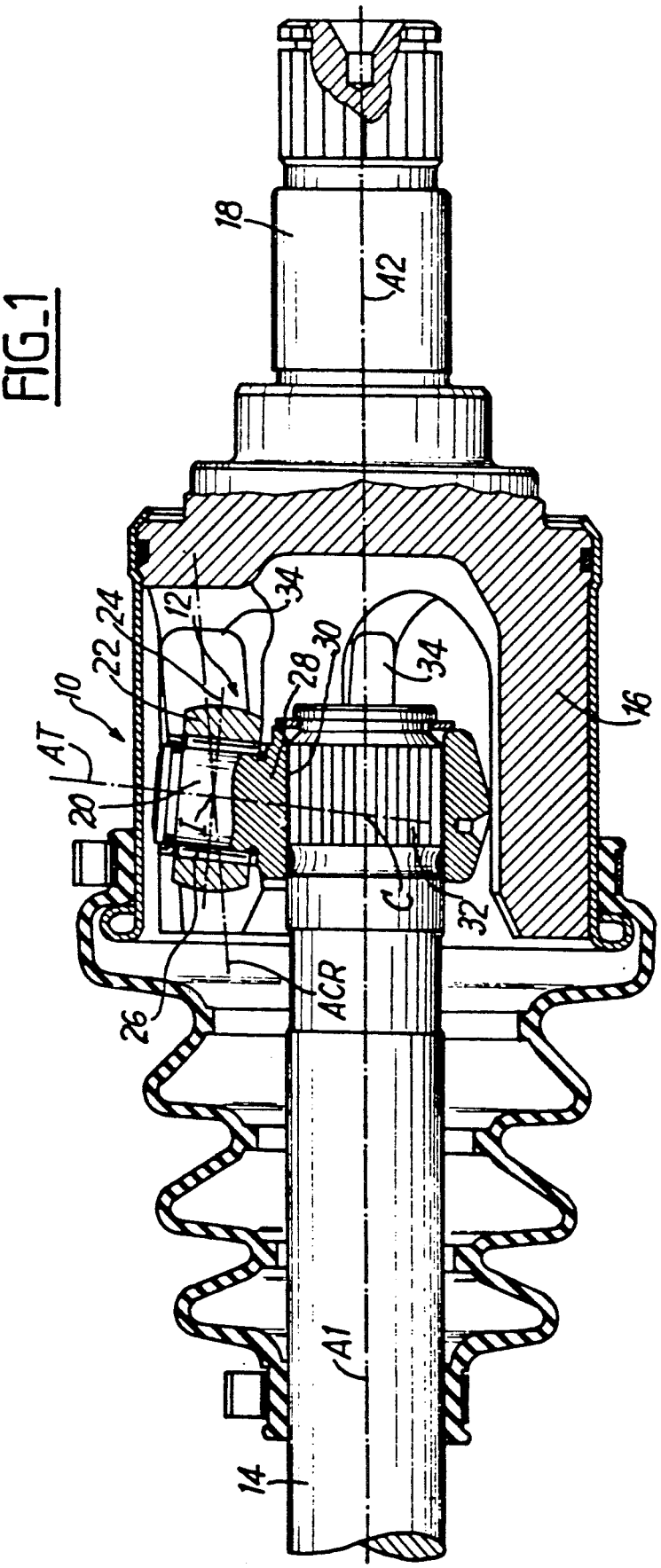
FIG. 1 is a view in axial section of an embodiment of a sliding transmission joint in accordance with the teachings of the invention.

A transmission joint 10 of the sliding type can be seen in FIG. 1, comprising a tripod 12 connected to a first shaft 14, and a body or barrel 16 connected to a second shaft 18.

The joint 10 is shown in FIG. 1 in its aligned position in which the geometrical axis A1 of the first shaft 14 coincides with the geometrical axis A2 of the second shaft 18.

The tripod 12 consists of three cylindrical arms or trunnion journals of axes AT 20 distributed angularly at 120° about the axis A1 of the shaft 14.

Each trunnion journal 20 receives a roller 22 of a spherical external profile 24 which is mounted so as to rotate and slide on the trunnion journal 20 with the interposition of a series of needle rollers 26. Each roller is mounted rotatably, and its axis of rotation coincides with the geometrical axis AT of the corresponding arm.

The trunnion journals 20 are connected at their base to a central hub 28, the splined internal bore 30 of which is mounted on the splined free end 32 of the first shaft 14, relative to which the hub 28 is immobilized axially.

As can be seen in FIG. 1, and as will be explained below, the geometrical axis AT of each trunnion journal 20 is not perpendicular to the axis A1 of the first shaft 14.

The barrel 16 is an element in the shape of a tulip which comprises three rolling paths distributed angularly at 120° about the axis A2 of the second shaft 18 and each of which accommodates a roller 22. Each rolling path comprises two parallel tracks 34.

In the embodiment shown in FIG. 1, the tracks 34 are straight-line tracks, and the center longitudinal axis ACR of each rolling path is inclined with respect to the axis A2 of the second shaft 18.

Figure 2:
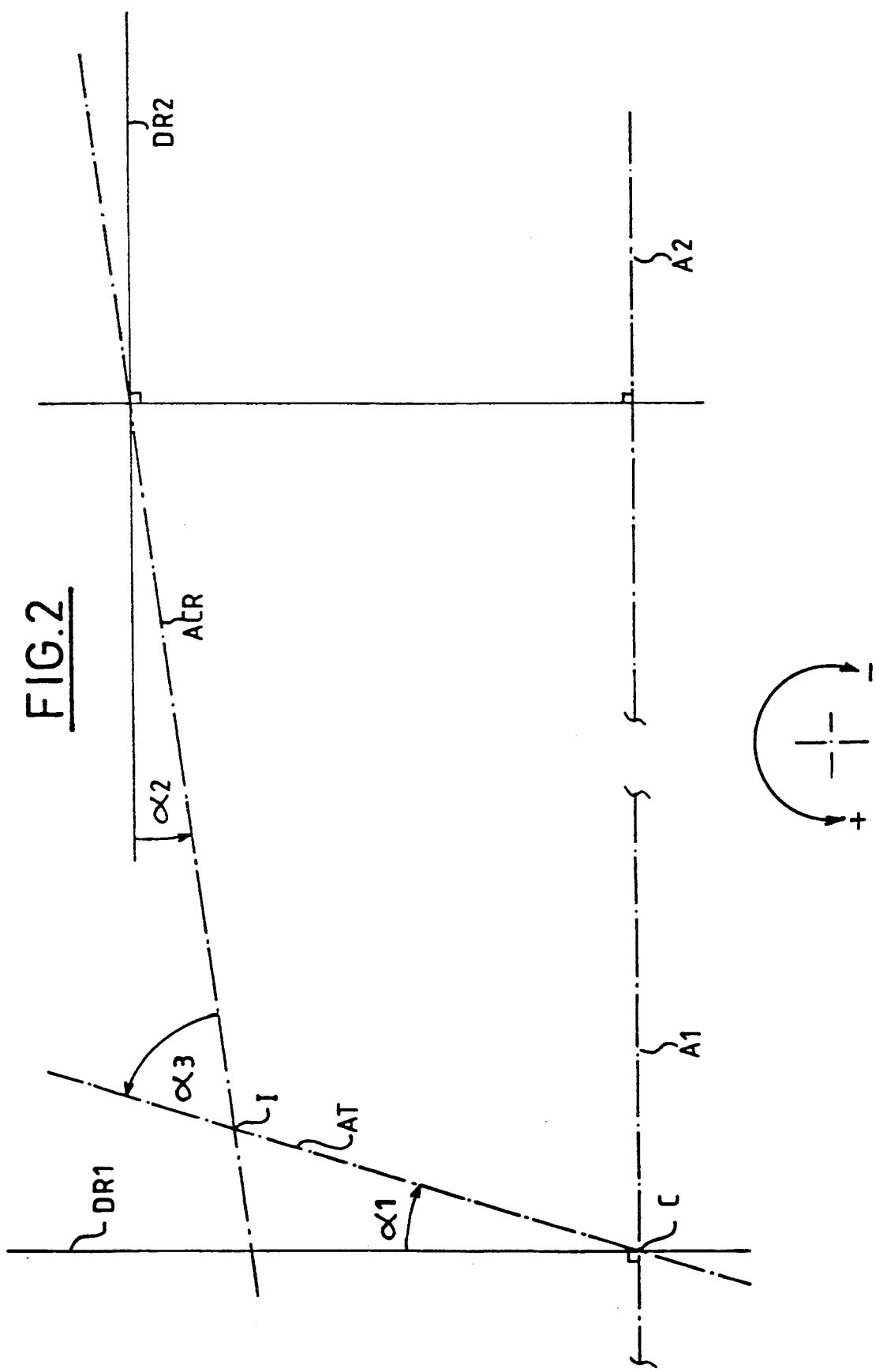
FIG. 2 is a diagram illustrating the geometrical arrangement of the axes of the various components of the joint shown in FIG. 1.

Reference will now be made to FIG. 2 for a more detailed description of the geometrical features of the sliding joint of FIG. 1.

The axis AT of the trunnion journal 20 is contained within a plane, the plane of the sheet of paper, containing the geometrical axis of the first shaft 14 which it intersects at C.

The axis AT forms a first acute angle $\alpha 1$ with respect to a reference line DR1 perpendicular to the axis A1 of the first shaft 18 and contained within the plane containing the geometrical axes A1 and AT.

In accordance with the trigonometrical convention adopted in FIG. 2, the angle $\alpha 1$ is a negative angle.

The center longitudinal axis AC of the rolling path associated with the trunnion journal is inclined with respect to the geometrical axis A2 of the second shaft 18, and hence with respect to a reference line DR2 parallel to the geometrical axis A2.

The axis ACR forms a second acute angle $\alpha 2$ with respect to the axis A2, and hence with respect to the straight line DR2.

The angle $\alpha 2$ is a positive angle according to the convention adopted.

The axis ACR is contained within the plane, the plane of the sheet of paper, containing the geometrical axis A2 of the second shaft 18 and which also contains the axes A1 and AT.

The point at which the axes AT and ACR coincide has been referenced by I. In the aligned position illustrated in FIGS. 1 and 2 in which the axes A1 and A2 coincide, the axis AT of the trunnion journal 20 forms a third angle $\alpha 3$ with respect to the axis ACR. The angle $\alpha 3$ is a positive angle.

In order to make the representation in FIG. 2 as clear as possible, the values of the acute angles $\alpha 1$, $\alpha 2$ and $\alpha 3$ have been increased relative to their actual value.

According to the invention, the value of the angles $\alpha 1$ and $\alpha 2$ is less than 15°.

One of the two angles $\alpha 1$, $\alpha 2$ can be zero.

The third angle $\alpha 3$ is less than 90°.

Figure 3:
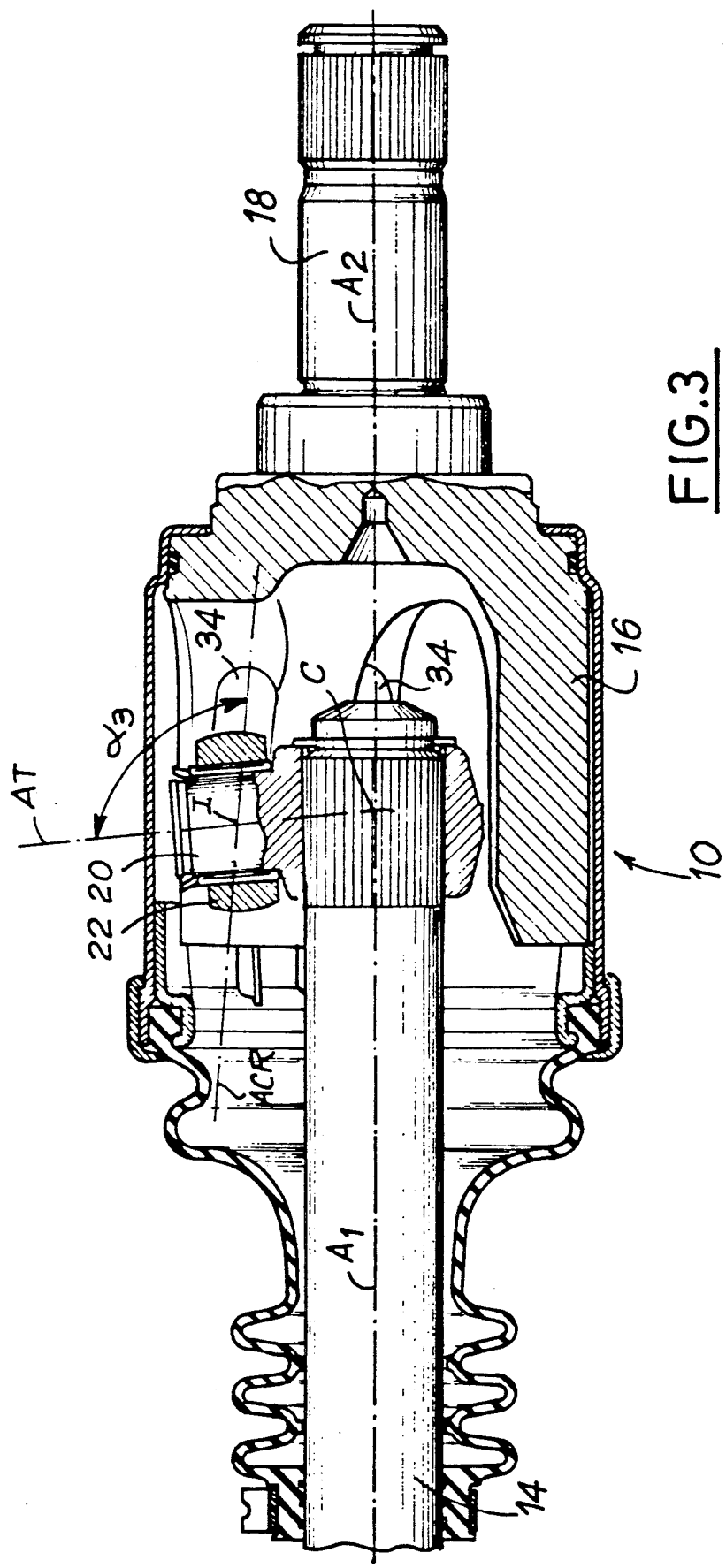
FIG. 3 is a view similar to that in FIG. 1 of a second embodiment of the invention.

In the embodiment illustrated in FIG. 3, the angle $\alpha 2$ is a negative angle in the sense of the convention of representation adopted in FIG. 2. The angle $\alpha 1$ is a positive angle, whereas the angle $\alpha 3$ is a positive angle greater than 90°.

Within the sense of the invention, the center longitudinal axis ACR of the rolling path designates the median axis between the two tracks which is parallel to the line passing through the opposite axial ends of a track 24, the latter not necessarily being a straight line but being able to have a curvature.

Selection of the value of the angles $\alpha 1$ and $\alpha 2$ such that their sum is substantially equal to twice the mean use angle of the joint on a vehicle proves to be particularly advantageous during the phases of acceleration of the vehicle.

We claim:

1. Transmission joint of the sliding type in which a first element (12) is connected to a first shaft (14) and comprises trunnion journals (20) distributed angularly in a regular manner about the geometrical axis (A1) of the first shaft (14), each trunnion journal (20) receives a rolling element (22) which is mounted so as to rotate about the geometrical axis (AT) of the trunnion journal and so as to slide on the trunnion journal such that the axis of rotation of said rolling element (22) is parallel to the geometrical axis of the trunnion journal, the geometrical axis (AT) of the respective trunnion journal forms a first acute angle ($\alpha 1$) with respect to a reference line (DR1) perpendicular to the axis (A1) of the first shaft (14) and contained within a plane containing the geometrical axes (A1, AT) of the first shaft (14) and of the respective trunnion journal (20), and in which a second element (16) is connected to a second shaft (18) and comprises rolling paths distributed angularly in a regular manner about the geometrical axis (A2) of the second shaft, each rolling path comprises two parallel tracks (34) between which is accommodated the rolling element (22), the center longitudinal axis (ACR) of the rolling path contained within a plane containing the geometrical axis (A2) of the second shaft (18) forms a second acute angle ($\alpha 2$) with the geometrical axis (A2) of the second shaft, characterized in that the vale of each of the said acute angles ($\alpha 1$, $\alpha 2$) is greater than 0° and less than 15°.

2. Transmission joint according to claim 1, characterized in that, when the joint is in its aligned position in which the geometrical axes (A1, A2) of the first shaft (14) and of the second shaft (18) coincide, the axis (AT) of the trunnion journal forms a third angle ($\alpha 3$) with respect to the center longitudinal axis (ACR) of the associated rolling path, the value of which is other than 90°.

* * * * *